United States Patent [19]

Falk

[11] 4,224,207
[45] Sep. 23, 1980

[54] HIGH IMPACT BLENDS OF SAN AND CROSS-LINKED POLYESTER ELASTOMERS

[75] Inventor: John C. Falk, Chicago, Ill.

[73] Assignee: Borg-Warner Corporation, Chicago, Ill.

[21] Appl. No.: 45,570

[22] Filed: Jun. 4, 1979

[51] Int. Cl.³ .......................... C08L 3/24; C08L 67/06
[52] U.S. Cl. ................................ 260/29.2 E; 525/175
[58] Field of Search ................ 525/175, 173, 174, 43, 525/562, 45, 569, 574; 260/29.2 E

[56] References Cited

U.S. PATENT DOCUMENTS

| | | | |
|---|---|---|---|
| 2,448,585 | 9/1940 | Fuller | 528/302 |
| 3,577,478 | 5/1971 | Thrope | 525/175 |
| 3,577,480 | 5/1971 | Thrope | 525/175 |
| 3,787,530 | 1/1974 | Bohn et al. | 525/175 |
| 3,935,153 | 1/1976 | Kudo et al. | 525/175 |
| 3,954,903 | 5/1976 | Kudo et al. | 525/175 |

*Primary Examiner*—J. Ziegler
*Attorney, Agent, or Firm*—Richard J. Schlott

[57] ABSTRACT

High impact compositions comprising from 80 to 60 wt % of a styrene-acrylonitrile copolymer and from 20 to 40 wt % of a cross-linked, aliphatic polyester elastomer. The polyester elastomer is produced by preparing a cross-linked latex of the polyester.

3 Claims, No Drawings

HIGH IMPACT BLENDS OF SAN AND CROSS-LINKED POLYESTER ELASTOMERS

BACKGROUND OF THE INVENTION

This invention relates to impact-modified styrene-acrylonitrile (SAN) copolymer resins. More particularly, this invention relates to high-impact blends comprising SAN and a cross-linked, polyester elastomer.

Styrene-acrylonitrile copolymers are strong, rigid transparent thermoplastics. SAN resins exhibit outstanding environmental resistance and find wide application for end-uses where exposure to foods, detergents, fuels and the like will occur. These resins are, however, extremely notch sensitive and their impact resistance is correspondingly very poor. SAN copolymers are incompatable with most rubbery polymers such as polybutadiene and the like, hence the rubber modification of SAN resins to improve impact is generally accomplished by graft polymerizing styrene and acrylonitrile monomers in the presence of a rubbery substrate, forming the widely known ABS graft polymer resins.

Linear aliphatic polyester elastomers have long been known in the art. These polymers are compatable with SAN, and blends of SAN with linear, uncross-linked polyesters as well as graft polymers of SAN on linear polyester rubbers have been disclosed in the prior art, as for example, in U.S. Pat. No. 3,577,478. Although these compositions exhibit many useful properties, the impact modification has been marginal.

Summary of the Invention

Linear aliphatic high molecular weight polyester elastomers, when suitably cross-linked, are effective impact modifiers for SAN resins. The polyester elastomers are prepared by conventional processes, converted to a latex and cross-linked in latex form to provide a finely divided particulate polyester elastomer which may be blended with SAN resins in latex or solution form. The polyester elastomer may also be coagulated to provide a free-flowing powdered solid which is readily compounded with SAN. The cross-linked, finely-divided, particulate polyester elastomer is a highly effective impact modifier for SAN polymers.

Detailed Description of the Invention

The cross-linked, polyester elastomers may be employed with any of the widely available styrene-acrylonitrile copolymer resins to form the high impact compositions of this invention. In general, the SAN resins comprise from 5 to 95 wt% acrylonitrile, and correspondingly from 95 to 5 wt% styrene. General purpose extrusion and molding grades of SAN resins commonly comprise from 5 to 50 wt% acrylonitrile, and food packaging resins comprise greater than 50 wt%, most often from 70 to 90 wt%, acrylonitrile. It will be understood that the styrene monomer component of the copolymer may be replaced in part by alpha methylstyrene monomer to impact improved high heat characteristics.

The cross-linked polyester elastomers suitable for the purposes of this invention are linear, high molecular weight aliphatic polyester rubbers which have been converted to a latex, then cross-linked. The latex may be employed in blending directly, or coagulated to form free-flowing rubber particles.

The polyesters suitable for the purposes of this invention are the linear aliphatic polyesters described and set forth in U.S. Pat. No. 2,448,585. In general, the elastomeric polyesters may be described as copolymers of aliphatic dicarboxylic acids and glycols wherein from about 0 to about 20% of the glycol and/or the dicarboxylic acid is ethylenically unsaturated. More particularly, the polyesters will be polymers of $C_2$ to $C_{10}$ alkylene glycols and $C_4$ to $C_{10}$ alkylene dicarboxylic acids wherein from 0 to about 20% of the glycol monomer component and/or the dicarboxylic acid monomer component is, respectively, a $C_4$ to $C_{10}$ dihydroxy alkene or a $C_4$ to $C_{10}$ alkenyl dicarboxylic acid. Examples of suitable alkylene glycols include ethylene glycol, propylene glycol, tetramethylene glycol, pentamethylene glycol, hexamethylene glycol, decamethylene glycol, the position isomers thereof such as isopropylene glycol neopentyl glycol, dimethyl tetramethylene glycol and the like, as well as mixtures thereof. Suitable dihydroxyalkenes include, for example, dihydroxybutene, dihydroxyhexene and the like. The alkylene dicarboxylic acids include, for example, succinic acid, adipic acid, sebacic acid and the like, as well as mixtures thereof. The alkenyl dicarboxylic acids which may be employed for the preparation of unsaturated polyesters include maleic acid, fumeric acid, itaconic acid, citraconic acid and the like. The polyesters may be readily produced by the processes set forth in the cited prior art, and the particular method of their preparation does not form a part of the instant invention.

In preparing the cross-linked polyester latex useful in the practice of this invention, the polyester is first dissolved in a suitable organic solvent. To be useful for the purposes of this invention, the organic solvent must be immiscible with water, and be sufficiently volatile to be readily stripped from an aqueous emulsion. Examples of suitable solvents include chloroform, methylene chloride, benzene, toluene and the like.

The solution will contain from about 5 to about 20 wt%, preferably from about 7.5 to about 12.5%, of the polyester. Concentrated solutions of polyesters are generally extremely viscous masses which flow and are dispersed only with great difficulty. The particular concentration to be employed will be chosen to provide a moderately viscous, readily pumpable liquid. Low concentrations, and in particular concentrations below about 5 wt%, are to be avoided in part to reduce the amount of solvent to be stripped from the emulsion in a subsequent step. In practice it has been found that for most combinations of solvents and polyesters a concentration in the preferred range of 7.5 to 12.5 wt% provides a readily dispersable, easily handled liquid.

An emulsion of the polyester is then prepared by mixing the solution of polyester with approximately an equal volume of water containing a surfactant. Any of the variety of commercially available surfactants such as the sodium alkyl aryl sulfonates may be employed to stabilize the emulsion. An amount of from about 0.5 to about 10 wt% based on the weight of polyester to be emulsified is generally sufficient to provide a stable latex. The mixing is carried out under high shear conditions, preferably by passing the mixture through a homogenizer to completely disperse the organic phase and form an essentially uniform, oil-in-water emulsion.

The solvent will then be stripped from the emulsion by heating the mixture and distilling the solvent. The distillation may be accomplished under vacuum, if desired, to hasten solvent removal, and steam-stripping or sparging may also be used if preferred. The resulting solvent-free latex comprises finely dispersed, uncross-linked polyester in aqueous emulsion.

Cross-linking of the polyester in latex form is accomplished by adding a suitable peroxide catalyst such as benzoyl peroxide, lauryl peroxide or the like, and heating the mixture of effect decomposition of the peroxide and cross-linking of the polyester. The amount of peroxide will be from about 0.5 to about 5 wt%, based upon the weight of polyester. Although the peroxide may be dispersed into emulsion prior to stripping or into the solvent-free, uncross-linked latex, it is generally more practical to add the peroxide to the solution of the polyester prior to forming the initial emulsion. The solvent-stripping and cross-linking can then be accomplished by heating the emulsion to effect solvent removal, then continuing the heating of the solvent-free latex to complete the cross-linking reaction. The product, a cross-linked polyester latex, may be employed in forming blends with solution or laticies of SAN polymers, or may be coagulated or precipitated to provide a cross-linked polyester rubber as a finely-divided, free-flowing powder for subsequent blending with SAN.

The SAN-polyester blends of this invention will comprise from about 20 to about 40 wt% of the cross-linked polyester elastomer, and, correspondingly, from about 80 to about 60 wt% of an SAN copolymer. At levels below about 20 wt% of the cross-linked polyester the impact improvement will become vanishingly small, while with increasing levels of modifier, the rigidity and flexural strength of the blends is decreased. At levels above about 40 wt% polyester modifier, the blends become too flexible and weak for most applications.

Preparation of Cross-linked Polyester Impact Modifiers

EXAMPLE 1

Preparation of the Polyester

A resin flask was charged with 70.1 g (0.48 m) of adipic acid, 4.8 g (0.078 m) of ethylene glycol, 29.5 g (0.39 m) of propylene glycol, 6.4 g (0.072 m) of 1,4 dihydroxybutene-2, (butenediol) and 0.24 g of zinc acetate catalyst. The mixture was heated at 140°–150° C. under nitrogen for approximately five hours. The temperature was then raised to 200°–200° over a two hour period, and held at that temperature under a vacuum of 0.5 mm for an additional two hours. The mixture was then cooled to room temperature. The reaction mass was a crummy solid having a $\eta sp/c$ of 0.61 (25° C.) and a number average molecular weight of 18,5000.

EXAMPLE 2

Preparation of a Polyester Latex

A solution of 20 g of the polyester of Example 1 in 200 ml of methylene chloride was prepared and added to 200 ml of water containing 0.2 g of an alkyl aryl sulfonate surfactant. The mixture was passed twice through a Manton Gaulin homogenizer to produce a stable emulsion. The emulsion was heated with stirring to 90° C. to distill out the methylene chloride, resulting in a stable latex of uncross-linked polyester elastomer.

The latex was coagulated with isopropanol, collected by filtration and dried to give a tacky solid gum. The gum was completely soluble in toluene, indicating that no gel formation had occurred.

EXAMPLE 3

Preparation of a Cross-linked Polyester Latex

A solution of 20 g of the polyester of Example 1 and 0.4 g of benzoyl peroxide in 200 ml of methylene chloride was prepared and emulsified with 200 ml of water containing 0.2 g of an alkyl aryl sulfonate surfactant as in Example 2. The emulsified mixture was heated with stirring to 90° C. to distill out the methylene chloride, then held at 90° C. for about 17 hours to effect cross-linking of the polyester. The product was a stable latex of cross-linked polyester.

The latex was coagulated with isopropanol, collected by filtration and dried to give a free-flowing powder. The powdered cross-linked elastomer had a gel content of 91% as determined by toluene extraction.

EXAMPLE 4

Preparation of a Cross-linked Saturated Polyester Latex

A saturated polyester was prepared from 0.48 m of sebacic acid and 0.44 m of propylene glycol, using 0.24 g of zinc acetate catalyst and employing the process of Example 1. A solution of 20 g of the polyester and 1.0 g of benzoyl peroxide in 200 ml of methylene chloride was emulsified, solvent stripped and cross-linked by heating at 90° C. for 16 hours, by following the methods of Example 3. The product was a stable latex of cross-linked, saturated polyester.

The cross-linked, saturated polyester was coagulated with isopropanol, collected by filtration and dried to give a free-flowing powder. The powdered cross-linked elastomer had a gel content of 71%, determined by extraction with toluene.

EXAMPLE 5

Preparation of a Cross-Linked Unsaturated Copolyester Latex

A polyester was prepared from 0.475 m of sebacic acid, 0.025 m of maleic acid, 0.50 m of neopentyl glycol and 0.125 m of ethylene glycol, using 0.25 g of zinc acetate catalyst and employing the process of Example 1. The product polyester had an $\eta sp/c$ of 0.67 (23° C.). A solution of 20 g of the polyester and 0.4 g of benzoyl peroxide in 250 ml of benzene was emulsified, solvent stripped and cross-linked by heating at 90° C. for 16 hours, following the methods of Example 3. The product was a stable latex of cross-linked polyester elastomer having a gel content of 83%, determined by toluene extraction.

As is apparent from the Examples, stable cross-linked saturated (Example 3) and unsaturated (Example 4) polyester laticies are readily produced by the process of this invention. The coagulation of the cross-linked laticies result in free-flowing powdered elastomers, completely different in physical characteristics from the tacky gum elastomers (Example 1). That the powdery nature of the products is not the result of precipitation from a latex is demonstrated by Example 2, in which as uncross-linked latex produces a gummy solid upon coagulation.

Preparation of the Blends

The following examples illustrate the preparation of blends typical of this invention.

Mill blends were prepared by mixing the requisite amounts of the polyester and the SAN resin on a two-roll mill at a temperature in the range 360°–400° F. for 4 to 10 minutes, then compression molded at 400° F. for 3 to 4 minutes to provide plaques and test specimens.

The solvent blends were prepared by adding the polyester latex to a 10% solution of the SAN in methylene chloride. The mixture was stirred, coagulated with methanol, and dried in a vacuum oven overnight. The blends were then milled at 360°–400° F. for 4 to 10 minutes and compression molded at 400° F. for 3 to 4 to provide plaques and test specimens.

molded at 400° F. for 4 minutes, had a notched Izod impact of 1.0 ft lbs/in notch.

Representative physical properties of the blends are summarized in Table II. The impact modified SAN resin compositions of this invention clearly are useful

TABLE I

Adipate-based Polyester Blends with SAN[1]

| Ex. No. | Propylene Glycol | Ethylene Glycol | Butene-diol | Gel Wt % | SAN[2] Wt % | Izod Impact ft lbs/in Notch, 73° F. |
|---|---|---|---|---|---|---|
| Control A | — | — | — | — | 100 | 0.4 |
| Control B[3] | 69 | 16 | 15 | 0 | 80 | 0.3 |
| 6 | 69 | 16 | 15 | 100 | 80 | 1.3 |
| 7 | 69 | 16 | 15 | 100 | 75 | 1.7 |
| 8 | 69 | 16 | 15 | 100 | 70 | 3.2 |
| 9 | 60 | 25 | 15 | 93.5 | 80 | 3.0 |
| 10 | 52 | 33 | 15 | 93.5 | 75 | 3.9 |
| 11 | 52 | 33 | 15 | 99.5 | 80 | 2.8 |
| 12 | 52 | 33 | 15 | 99.5 | 75 | 5.4 |

Notes:
[1] Polyesters prepared as in Example 1, cross-linked as in Example 3, using indicated glycols in mole fractions shown.
[2] SAN is a 70 wt % styrene, 30 wt % acrylonitrile copolymer obtained as Tyril 880 B from Dow Chemical Co. Blends prepared from 10% sol'n of SAN by adding requisite amount of latex, see text.
[3] Control B: Polyester converted to latex without cross-linking, as in Example 2, and blended.

It will be apparent from these data that SAN blends containing as little as 20 wt% of a cross-linked aliphatic polyester elastomer, Examples 6, 9 and 11, have substantially better notched Izod impact values as compared with SAN alone, Control Example A. Greater levels of cross-linked polyester elastomer provide further increases in impact reinforcement, as shown by Examples 7, 10 and 12 for 25 wt% modifier, and Example 8 for 30 wt% modifier. The uncross-linked polyester elastomer, Control Example B, provided no impact reinforcement when present in SAN at the same level.

Changes in the structure of the aliphatic polyester elastomer result in differences in the degree of impact modification. Thus, increasing the proportion of ethylene glycol from 16 mole % through 25 mole % to 33 mole % provides a significant increase in level of impact modification, as will be seen by comparing Example 6 with 9 and 11 and Example 7 with 10 and 12.

EXAMPLE 13

A polyester was prepared from 0.48 m of sebacic acid, 0.33 m of propylene glycol, 0.077 m of ethylene glycol and 0.073 m of butene diol substantially by the procedure of Example 1. The polyester was converted to a latex and cross-linked by the procedure of Example 3 to give a stable latex. The cross-linked polyester elastomer had a gel content of 80%, by toluene extraction. A solution-latex blend containing 20 wt% of this cross-linked polyester elastomer and 80 wt% SAN, prepared as given above, had a notched Izod impact value of 0.7 ft lbs/in notch.

The data from Example 13 further demonstrate that although variations in level of impact modification result from changes in molecular structure, compositions comprising SAN and cross-linked aliphatic polyester elastomers exhibit improved impact properties compared with SAN copolymer resins.

The blends need not be prepared by the solution-latex method described above; a mill blend analogous to Example 6 was prepared by combining the coagulated and dried cross-linked polyester with SAN and 0.25 wt% magnesium stearate processing aid on a two-roll mill at 350° F. for 7 minutes. The blend, compression thermoplastic resins having high rigidity and tensile strength characteristics. The rigidity and tensile properties decrease with increasing modifier level, and above about 30 wt% polyester, Example 8, the blends begin to lose the rigid character of SAN copolymer resins. The physical properties summarized in the Tables are values obtained for single preparations of the various impact modifiers. Molding conditions, levels of cross-linking and blending methods were not optimized; these data serve to demonstrate that useful impact modification of SAN resins is attained with the compositions of this invention.

TABLE II

Physical Properties of SAN-Polyester Blends[1]

| Ex. No. | HDT[2] % | Tensil Str psi | E % | Flex Mod Kpsi | Flex Str Kpsi |
|---|---|---|---|---|---|
| 6 | 95 | 7100 | 9 | 377 | 13.7 |
| 7 | 89 | 5500 | 21 | 352 | 11.9 |
| 8 | 88 | 4900 | 52 | 269 | 9.4 |
| 9 | 94 | 6200 | 14 | 345 | 11.5 |
| 10 | 90 | 5300 | 32 | 311 | 10.4 |
| 11 | 91 | 6200 | 17 | 328 | 12.1 |
| 12 | 90 | 5600 | 16 | 306 | 10.7 |
| Control B | 59 | 7900 | 5 | 512 | 13.8 |

Notes:
[1] Blend Compositions as set forth in Table 1.
[2] HDT, 10 mil deflection at 264 psi.

The invention will thus be seen to be a high impact resin blend comprising from about 80% to about 60 wt% of an SAN copolymer and correspondingly from about 20 to about 40 wt% of a cross-linked, aliphatic polyester elastomer. The blends may further comprise dyes, pigments, stabilizers, fillers and processing acids such as are commonly employed in the resin formulating art. Further modifications of the teaching of the present invention will be apparent to those skilled in the art and may be made without departing from the spirit and scope of the invention which is defined solely by the following claims.

I claim:

1. A composition comprising from about 80 to about 60 wt% styrene-acrylonitrile copolymer and from about 20 to about 40 wt% of a cross-linked, aliphatic polyester elastomer.

2. The composition of claim 1, wherein said styrene-acrylonitrile copolymer comprises from 5 to 95 wt% acrylonitrile and from about 95 to about 5 wt% of a monomer selected from the group consisting of styrene, alpha methyl styrene and mixtures thereof.

3. The composition of claim 1, wherein said polyester is prepared by

A. Preparing a solution comprising from 95 to 80 parts by weight of a water-immiscible organic solvent, from 5 to 20 parts by weight of an aliphatic polyester elastomer and from 0.5 to 5 wt%, based on polyester, of an organic peroxide;

B. Mixing said solution with an equal volume of water containing from 1 to 10 wt%, based on polyester, of a surfactant;

C. Passing said mixture through a homogenizer to form an emulsion;

D. Heating said emulsion to remove said solvent; and

E. Further heating said emulsion to cross-link said polyester.